United States Patent
Hino et al.

(10) Patent No.: US 6,452,739 B1
(45) Date of Patent: Sep. 17, 2002

(54) PRECISE POSITIONING DEVICE AND METHOD FOR SERVO TRACK WRITING

(75) Inventors: Yoshinori Hino; Hirofumi Ohsawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/390,512

(22) Filed: Sep. 3, 1999

(30) Foreign Application Priority Data

Mar. 17, 1999 (JP) .......................................... 11-072604

(51) Int. Cl.[7] .............................................. G11B 21/02
(52) U.S. Cl. ...................................... 360/75; 360/78.12
(58) Field of Search .............................. 360/75, 78, 12; 318/561, 568, 560, 254; 369/44.11, 44.14

(56) References Cited

U.S. PATENT DOCUMENTS

| | | | | |
|---|---|---|---|---|
| 5,442,172 A | * | 8/1995 | Chiang et al. | 360/75 X |
| 5,612,602 A | * | 3/1997 | Kubota et al. | 360/75 X |
| 5,909,333 A | * | 6/1999 | Best et al. | 360/75 X |
| 5,991,112 A | * | 11/1999 | Song et al. | 360/75 |

FOREIGN PATENT DOCUMENTS

JP            199486        4/1989

* cited by examiner

Primary Examiner—David Hudspeth
Assistant Examiner—K. Wong
(74) Attorney, Agent, or Firm—Greer, Burns & Crain, Ltd.

(57) ABSTRACT

A positioning device positions a driving unit of which a torque constant fluctuates depending on a position, whereby a proper quantization error is obtained even when a maximum current value in a movable range changes. The positioning device includes a position detector for detecting a present position of the drive unit, a control circuit for generating a digital drive command value corresponding to a positional error between a command position and a present position, a D/A converter for converting the digital drive command value into an analog voltage, and a driver, having a plurality of gains, for converting the analog voltage into the analog drive current with a selected gain. The control circuit selects the gain of the driver in accordance with the present position. The gain of the driver (voltage/current converting amplifier) is made variable and controlled corresponding to the position, and hence there is no necessity for covering the maximum current range with the digital command value. Therefore, the proper quantization error is obtained in the entire movable range, and the maximum current value needed in the position is obtained.

17 Claims, 8 Drawing Sheets

PRECISE POSITIONING DEVICE AND METHOD FOR SERVO TRACK WRITING

BACKGROUND OF THE INVENTION

1. Field of the Invention

The present invention relates generally to a positioning device and a positioning method for positioning a drive unit of which a torque constant fluctuates depending on a position, and more particularly to a positioning device and a positioning method for reducing torque fluctuations of a driving unit.

2. Description of the Related Art

A DC motor such as a voice coil motor etc is widely utilized as a driving unit of a positioning device. A positioning accuracy on the order of 1 micron or under is requested of such a positioning device.

FIG. 7 is an explanatory diagram showing a prior art positioning mechanism. FIG. 8 is a control block diagram in the prior art. FIG. 9 is an explanatory diagram showing an operation in the prior art. FIG. 10 is a diagram showing a torque characteristic of a DC motor. FIG. 11 is an explanatory diagram showing a positioning operation of a servo control system. FIG. 12 is an explanatory diagram showing a drive current value.

As illustrated in FIG. 7, an arm 90 rotates about a rotary shaft 93. A coil 91 is wound on a rear end of the arm 90. A pair of magnets 92 are provided in a face-to-face relationship with the coil 91. In this type of rotary actuator, an electric current flows through the coil 91, thereby rotating the arm 90.

Referring to FIG. 10, the solid line indicates a torque measured value measured in each position of the arm 90 by flowing a constant current through the coil 91, and a one-dotted chain line indicates a torque design value under the same conditions. As shown in FIG. 10, the torque measured value exhibits such a characteristic that this value decreases in positions of marginal areas on both sides of an arm movable range.

The reason therefor is that a magnetic flux changes when the coil of the arm 90 is, as illustrated in FIG. 9A, disposed in the central position of the magnet and when one side of the coil of the arm 90, as illustrated in FIG. 9B, becomes proximal to the edge of the magnet. Namely, as shown in FIG. 9B, in a limit position in the arm movable range, one side of the coil is disposed at the edge of the magnet 92, while the other side of the coil is disposed at the center of the magnet 92. At the edge of the magnet 92, a leakage magnetic flux of the magnet 92 increases, and, at the central position of the magnet 92, the magnetic flux decreases due to mutual interference between the upper and lower magnets.

This torque fluctuation might induce a decline of the positioning accuracy and a prolonged positioning time in the positions at both edges of the magnet. As shown in FIG. 12, for keeping this torque constant in all movable range, it is required that the drive current applied to the coil 91 be increased in the areas where the torque measured value decreases.

FIG. 8 is a control block diagram showing a servo control system. As shown in FIG. 8, the servo control system obtains a positional error between a command position and a present position. Then, the positional error is multiplied by the control parameters PID, thus creating a command value. The control parameters are a proportion P, an integration I and a differential D. This command value is given to a motor. The command value is converted into a position by use of a mechanical transfer function K of the motor.

In the positioning operation of the servo control system, as indicated by a solid line in FIG. 11, the drive current flows so that a deceleration is performed after implementing an acceleration. With this operation, the position of the actuator converges in the command position, as shown by the solid line in FIG. 11. In the servo control system, the command value changes corresponding to the positional error, and hence a drive current value increases as indicated by a dotted line in FIG. 11 in the area where the torque becomes deficient. Therefore, when using the servo control system, the drive current value is automatically controlled so as to make the torque constant.

There arise, however, the following problems inherent in the prior art.

First, when servo controlling so as to obtain the constant torque in all movable range, a difference on the order of several hundreds mA generates between the value of the drive current applied to the coil in the central area and the drive current in the marginal areas on both side of the movable range. In a voltage/current converting unit (driver) for converting the command value into the drive current, a maximum output current value of the driver is determined corresponding to a maximum drive current in the marginal areas on both side of the movable range, in which the current value is needed most. In the prior art, a gain of the driver is fixed. Therefore, it is required that the current range of the command value be enlarged. According to this method, however, there might increase a quantization error in the command value of a control unit (processor) for calculating the current command value. Therefore, a minute positioning accuracy declines. Particularly, there is brought about a decline of the stepwise positioning accuracy as minute as approximately 1 micron.

Second, the maximum drive current value required in the central area is 20 mA. Therefore, when the quantization error in the command value is large, the S/N ratio of the drive current might deteriorate in the central area.

Third, it can be considered that the maximum current value of the driver is decreased in order to reduce the quantization error in the command value of the control unit. If done so, as indicated by the dotted line in FIG. 11, it follows that the drive current is limited in the marginal areas on both sides of the movable range. The drive current thereby takes a saw-tooth configuration, resulting in vibrations of the actuator.

SUMMARY OF THE INVENTION

It is a primary object of the present invention to provide a positioning device and a positioning method capable of minimizing a torque fluctuation in a whole movable range of a driving unit.

It is another object of the present invention to provide a positioning device and a positioning method capable of obtaining a proper quantization error even when a maximum current value in the movable range might change.

It is a further object of the present invention to provide a positioning device and a positioning method capable of preventing a decline of a positioning accuracy even when moved at a minute distance within the whole movable range.

To accomplish the above objects, according to one aspect of the present invention, a positioning device comprises a position detector for detecting a present position of the drive unit, a control circuit for generating a digital drive command value corresponding to a positional error between a command value and the present position, a D/A converter for converting the digital drive command value into an analog voltage, and a driver, having a plurality of gains, for converting the analog voltage into the analog drive current of the drive unit with a selected gain. The control circuit select the gain of the driver in accordance with the present position.

A positioning method for positioning a drive unit in a command position, comprises a step of detecting a present position of the drive unit, a step of calculating a digital drive command value corresponding to a positional error between the command position and the present position, a step of selecting a drive gain in accordance with the present position, a step of D/A converting the digital command value into an analog voltage, and a step of converting the analog voltage into an analog drive current of the drive unit with said selected drive gain.

According to the present invention, the gain of the driver (voltage/current converting amplifier) is controlled corresponding to the position of the drive unit, thereby controlling a maximum current value. With this contrivance, there are provided the driver (voltage/current converting amplifier) having the plurality of gains, and the control circuit for selecting the gain corresponding to the detected position.

Thus, when the gain of the voltage/current converting amplifier is made variable and controlled corresponding to the position, there is no necessity for covering the maximum current range with the digital command value. Therefore, the proper quantization error is obtained in the entire movable range, and the maximum current value needed in that position is obtained.

According to another aspect of the present invention, the drive unit is constructed of a DC actuator having a magnet and a coil, and the control circuit selects the gain of the voltage/current converting amplifier so that a first selected gain at a central area of a movable range of the DC actuator differs from a second selected gain of marginal areas on both sides of the movable range.

According to still another aspect of the present invention, the control circuit has a plurality of control parameters for calculating the digital drive command value from the positional error, and selects the control parameter corresponding to the selected gain.

According to a further aspect of the present invention, the voltage/current converting amplifier includes an input gain setting circuit for setting an input gain of the inputted analog voltage between a plurality of input gains and an amplifier for converting into an analog current the analog voltage given the input gain from the gain setting unit.

According to a still further aspect of the present invention, the control circuit is constructed of a processor.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENT

Figure 1:
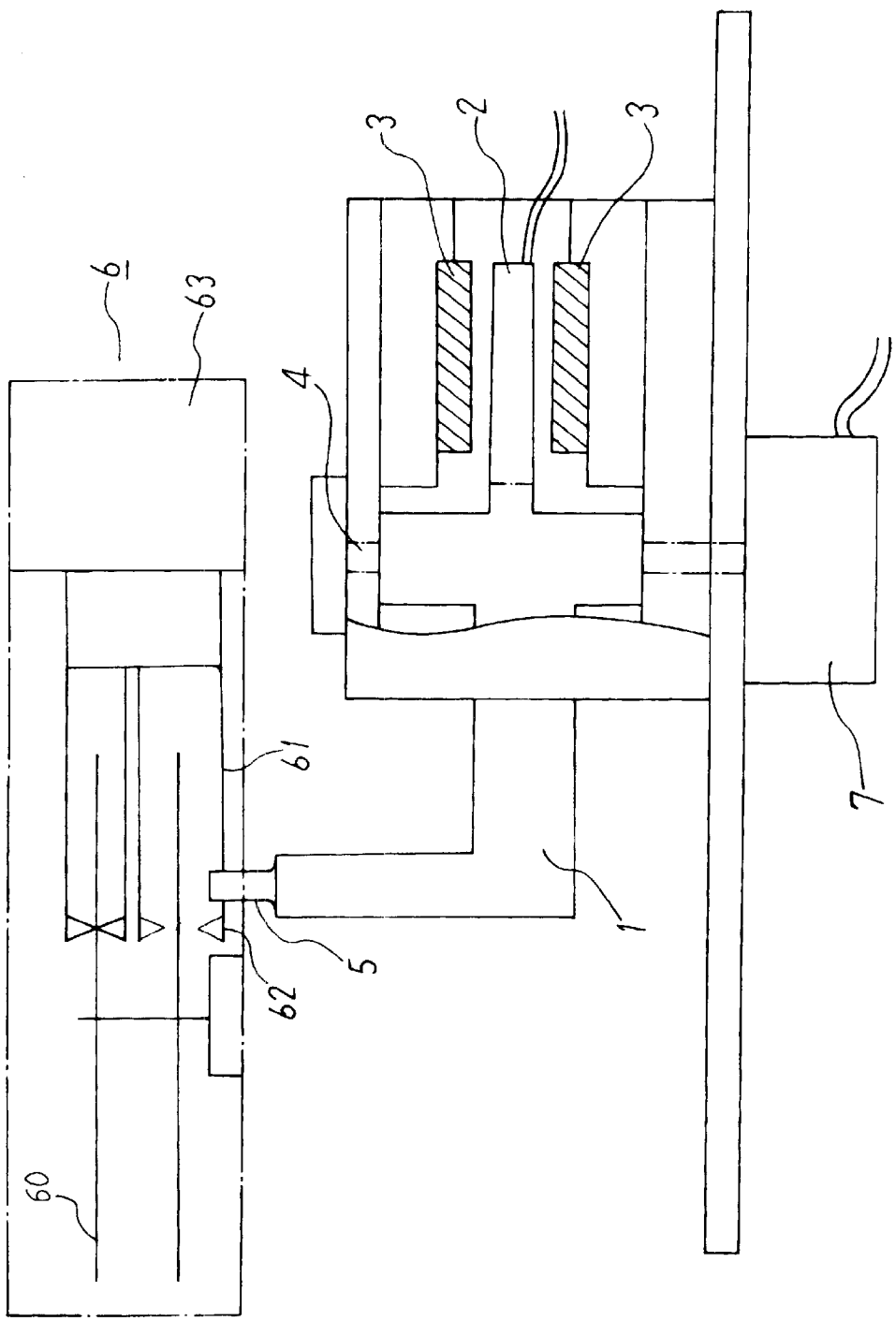
FIG. 1 is a diagram showing a construction of a servo track writer in one embodiment of the present invention.
Figure 2:
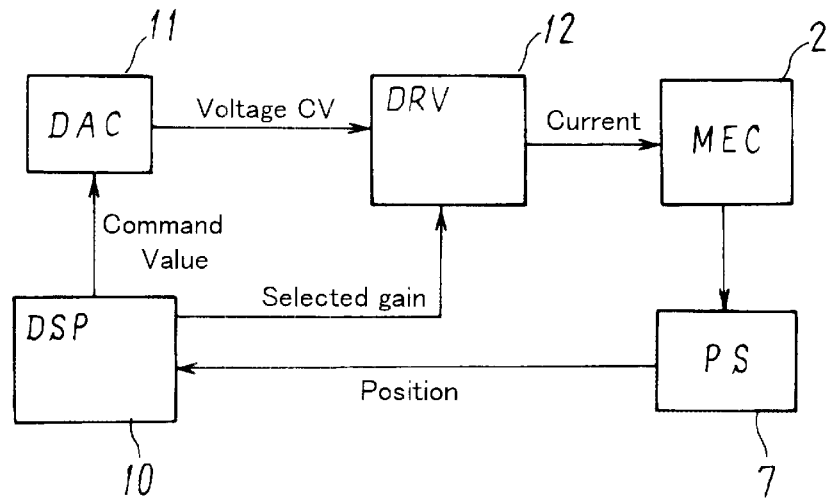
FIG. 2 is a control block diagram in one embodiment of the present invention.
Figure 3:
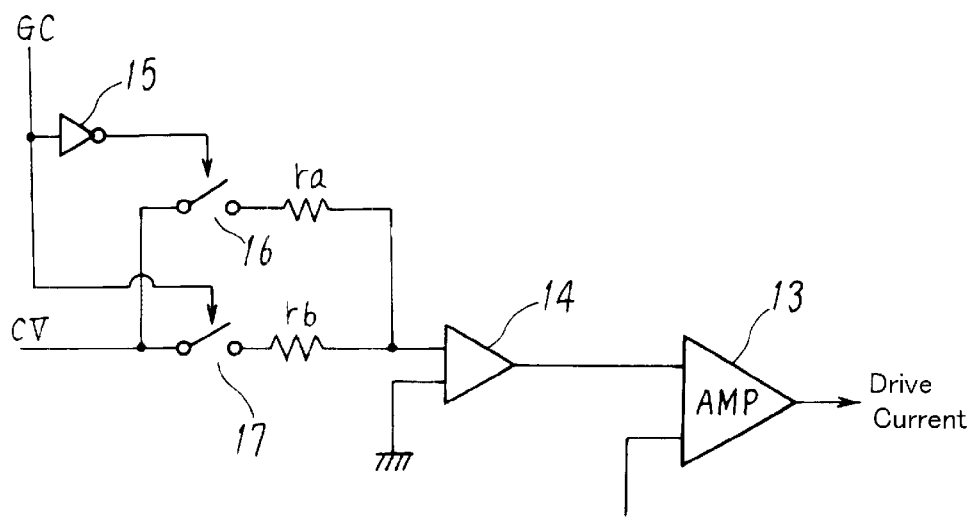
FIG. 3 is a circuit diagram of a driver shown in FIG. 2.

FIG. 1 is a diagram showing a construction of a servo track writer in one embodiment of the present invention. FIG. 2 is a control block diagram in one embodiment of the present invention. FIG. 3 is a circuit diagram of a voltage/current converting amplifier.

FIG. 1 illustrates a servo track writer (STW) for writing a servo signal on to each track of a magnetic disk in a hard disk drive. With a higher density of the hard disk, a track pitch is narrowed down to approximately 1 micron. Therefore, the STW also needs a positioning accuracy on the order of 1 micron or under.

As illustrated in FIG. 1, an arm 1 rotates about a rotary shaft 4. A coil 2 is wound on a rear end of the arm 1. A pair of magnets 3 are provided in a face-to-face relationship with the coil 2. A tip 5 of the arm 1 presses an arm 61 of a hard disk drive 6. A position detector 7 is provided at the rotary shaft 4 of the arm 1, and detects a position of the arm 1.

The hard disk drive 6 includes a magnetic disk 60, a magnetic head 62 for reading and writing data from and to the magnetic disk 60, an arm 61 for supporting the magnetic head 62, and a voice coil motor 63 for driving the arm 61 in order to position the magnetic head 62 on a desired track of the magnetic disk 60.

To explain an operation of the STW, the pin 5 of the arm 1 of the STW is inserted into a hole formed in an enclosure of the hard disk drive 6, and engages with the arm 61 of the hard disk drive 6. The arm 1 of the STW positions the arm 61 of the hard disk drive 6 on each track of the magnetic disk 60. The arm 1 moves, for example, on a 1-micron-basis and executes the positioning process. The magnetic head 62 records the servo signal on the magnetic disk 60 in the thus set position. Hence, the positioning accuracy on the order of 1 nanometer is requested of the positioning device of the STW.

FIG. 2 is the block diagram showing a positioning control system. A control circuit 10 is constructed of a digital signal processor (DSP). The DSP 10 obtains a present position from the position detector 7, and thereafter calculates positional error between a command position and the present position. The command position is changed for step-wise positioning control. The DSP 10 calculates a command value, by multiplying control parameters (PID) to this positional error. Further, the DSP 10 holds gain values corresponding to the positions, and selects the gain value in accordance with the present position.

A digital/analog converter (DAC) 11 converts a digital command value of DSP 10 into an analog control voltage CV. A driver 12 is constructed of a voltage/current converting amplifier. The driver 12 has a plurality of input gains, and, with the input gain selected by the DSP 10, converts the control voltage into a drive current. The coil 2 of an actuator is driven by the drive current of the driver 12. A position of the actuator is detected by the position detector 7.

FIG. 3 is the circuit diagram of the driver.

As shown in FIG. 3, a first resistance ra and a second resistance rb are provided in parallel at an input of a pre-amplifier 14. An analog switch 17 is provided in series to the first resistance ra. An analog switch 16 is provided in series to the second resistance rb. An inverter 15 inverts a gain select signal GC, and controls the analog switch 16. The analog switch 17 is controlled by the gain select signal GC from DSP 10.

A control voltage CV is inputted via the resistance ra and the resistance rb to the pre-amplifier 14, and is thereafter converted into a drive current by the voltage/current converting amplifier 13. Accordingly, one of the analog switches 16 and 17 is selected by the gain select signal GC from DSP 10. With this selection, any one of the first resistance ra and the second resistance rb is connected to the pre-amplifier 14.

An input gain of the control voltage CV is determined by this connected resistance, and is converted into the drive current by the voltage/current converting amplifier 13 through the pre-amplifier 14. Hence, this embodiment exemplifies the driver of which the input gain changes at two stages.

Figure 4:
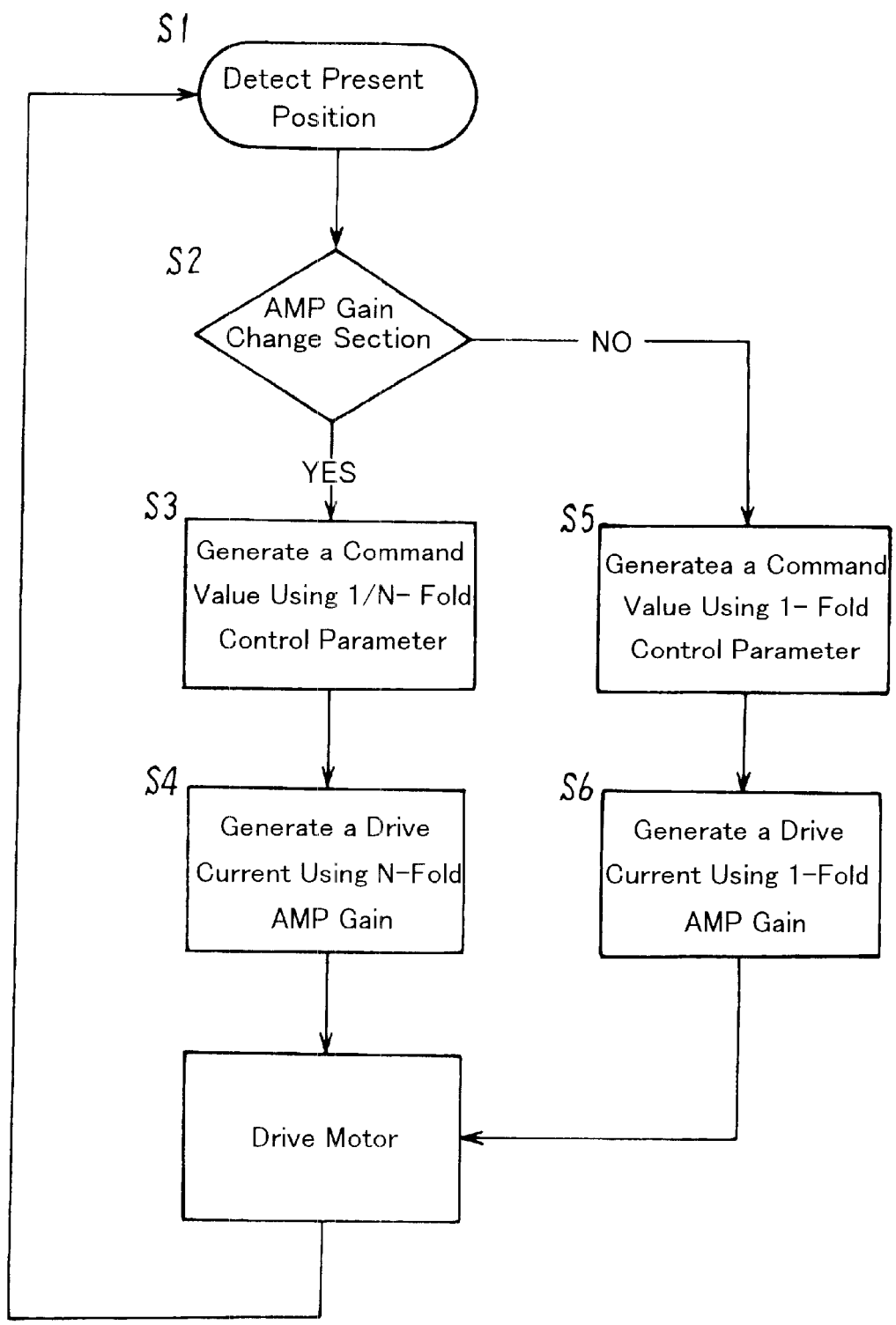
FIG. 4 is a flowchart showing positioning control processes of a DSP in FIG. 2.
Figure 5:
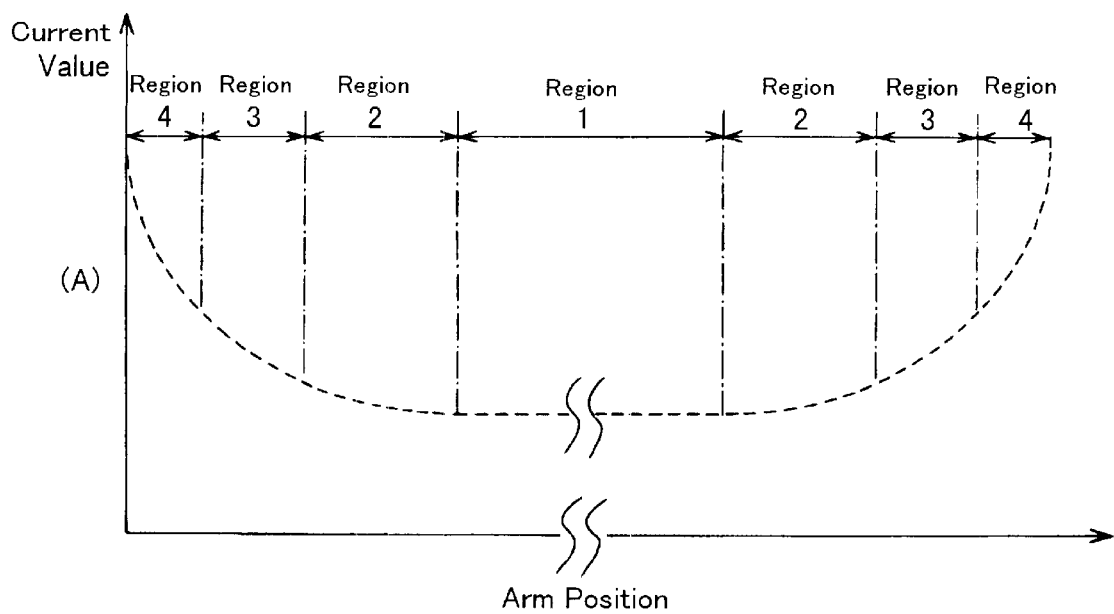
FIG. 5 is an operational explanatory diagram showing the positioning control processes in FIG. 4.
Figure 6:
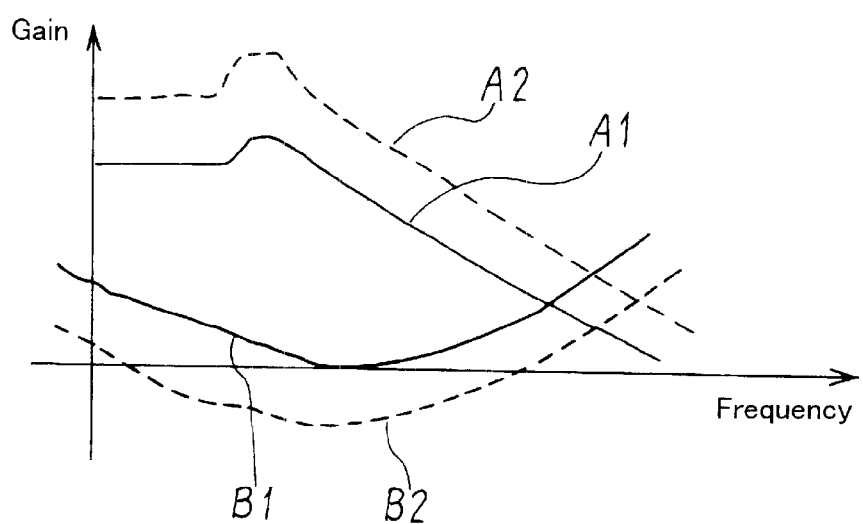
FIG. 6 is a frequency characteristic diagram of a servo system in FIG. 2.
Figure 7:
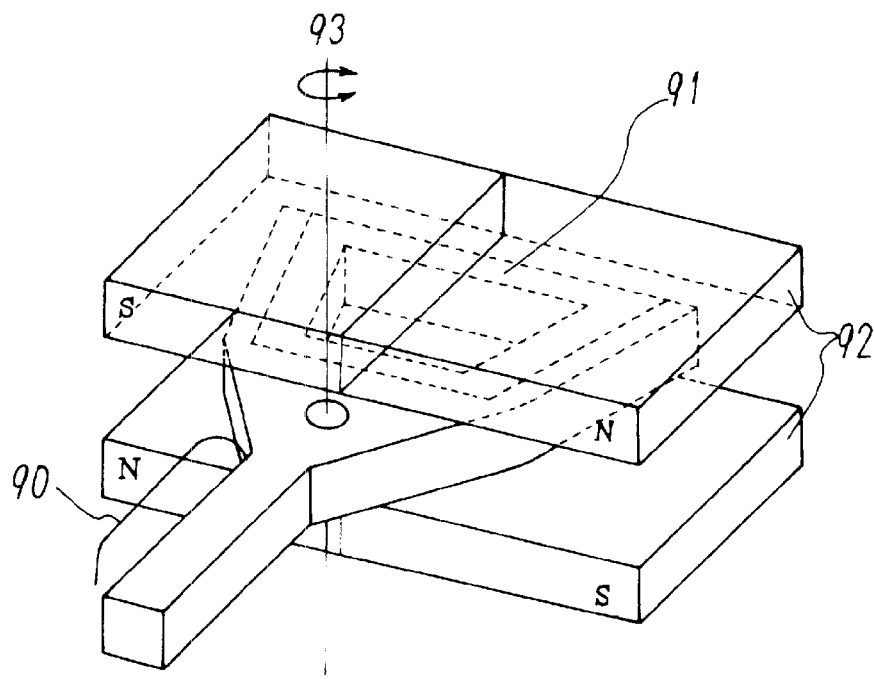
FIG. 7 is an explanatory diagram showing a positioning mechanism in the prior art.
Figure 8:
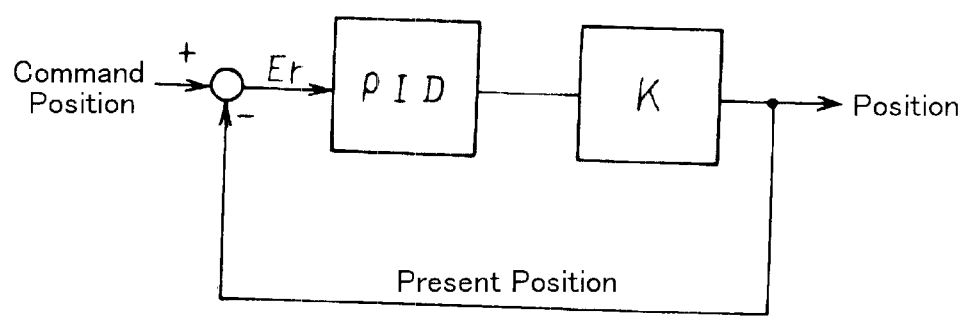
FIG. 8 is a servo control block diagram in the prior art.
Figure 9A:
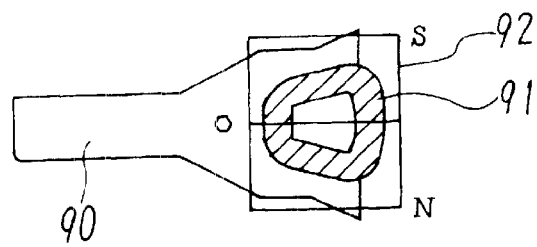
FIGS. 9A and 9B are explanatory diagrams showing the prior art positioning mechanism.
Figure 9B:
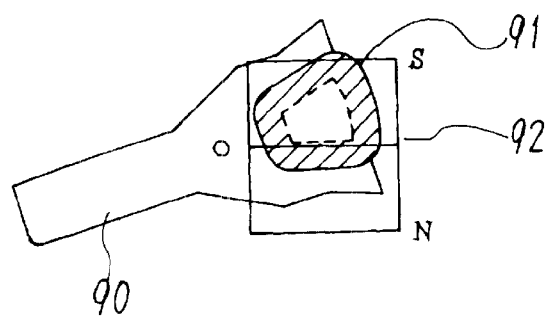
Figure 10:
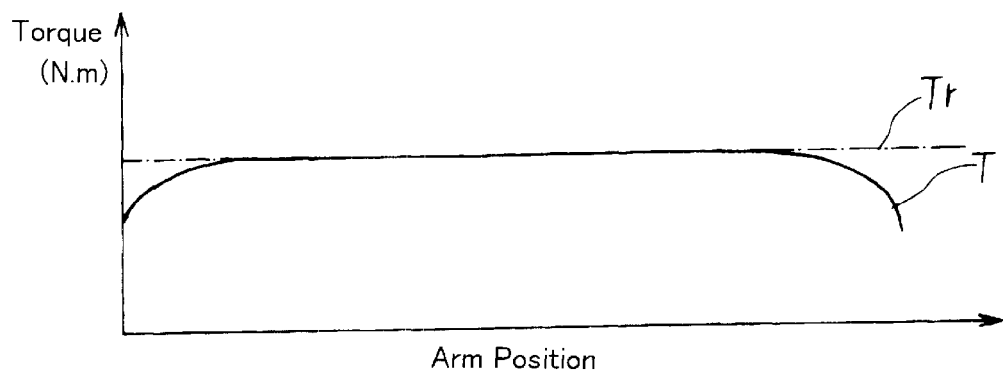
FIG. 10 is a torque characteristic diagram of the prior art positioning mechanism.
Figure 11:
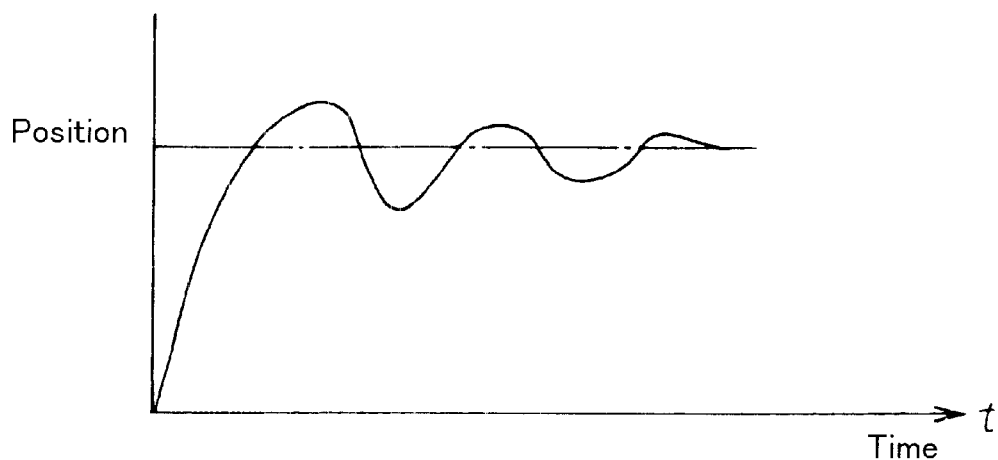
FIG. 11 is an explanatory diagram showing a positioning operation in the prior art.
Figure 11:
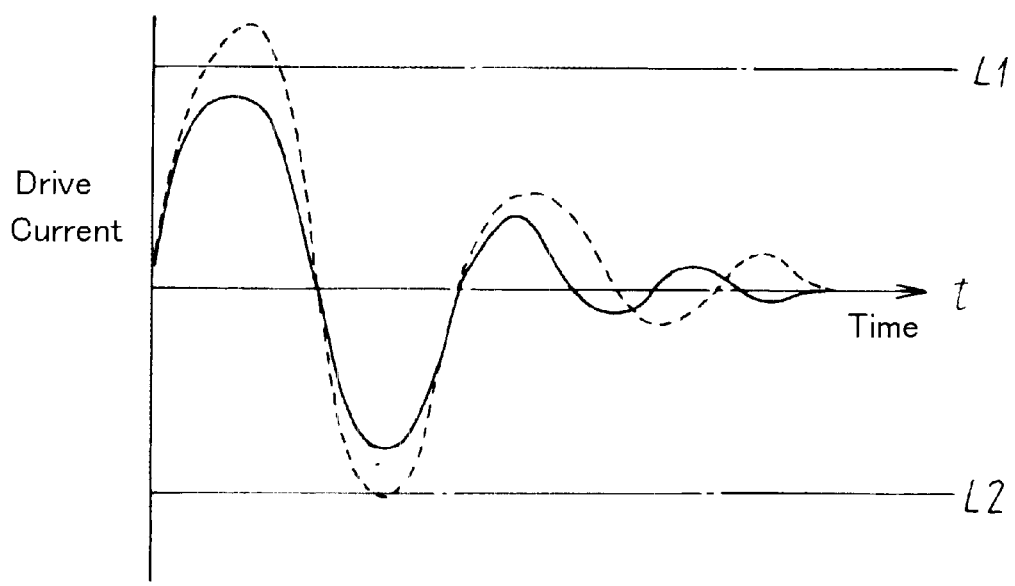

FIG. 4 is processing flowchart of the control circuit shown in FIG. 2. FIG. 5 is an explanatory diagram showing an operation thereof. FIG. 6 is a frequency characteristic diagram of a servo system.

Figure 12:
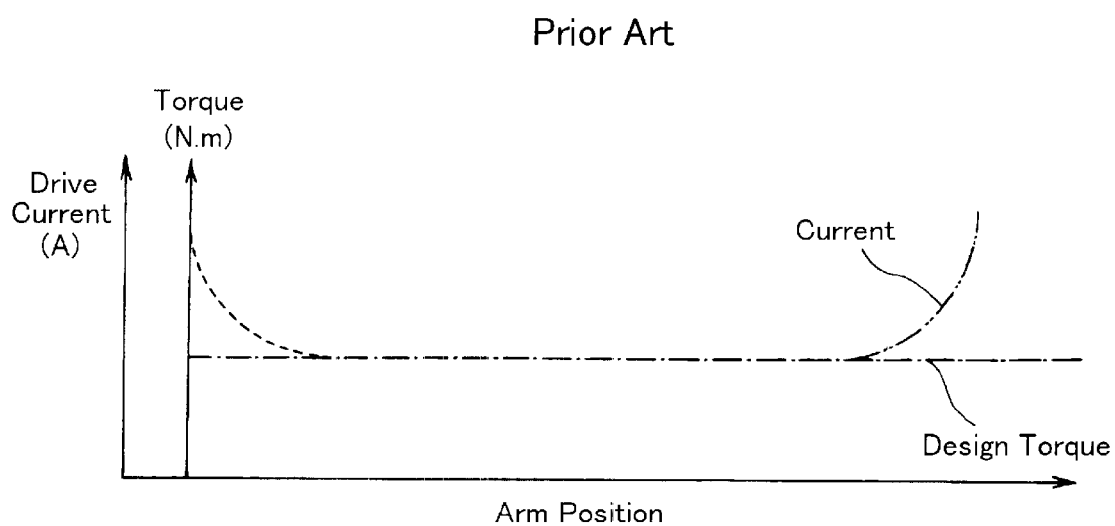
FIG. 12 is an explanatory diagram showing a drive current value in the prior art.

Before executing the processes in FIG. 4, to start with, a maximum current value in each position is measured, and a driver gain in each position is determined. That is, a correlation between an arm position and a current value in this position is determined on condition that the torque is constant in an entire movable range. Therefore, after a torque sensor is set at the arm 1, the arm 1 is positioned at each position in a movable range. In each position, a drive current value that the generated torque becomes fixed, is measured. A result of this measurement is as shown in FIG. 12. Based on the drive current values obtained from the result of the measurement, the entire movable range is divided into some regions. FIG. 5 shows the movable range divided into four regions.

Then, a driver gain in each region is determined. The gain is set to such a value that a proper quantization error is obtained in the region concerned, and that the maximum current value required for the drive is ensured. The DSP 10 makes a memory stored with a range of each region and the gain in that region. Next, the positioning process in FIG. 4 will be explained. Note that the explanation in FIG. 4 is made on the assumption that the range is divided into two regions comprising a amplifier gain change section and a not change section.

(S1) The DSP 10 detects the present position of the position detector 7.

(S2) The DSP 10 judges whether or not the present position is within an amplifier gain change section (second section).

(S3) When the present position is within the amplifier gain change section, the DSP 10, after calculating a positional error between the command position and the present position, calculates a command value by use of the control parameters PID, and outputs the command value to the DAC 11. At this time, the gain of the amplifier is increased by a factor N (N>1) in step S4, and hence a gain of a control loop becomes large. Namely, as shown in a gain versus frequency characteristic diagram of FIG. 6, a frequency characteristic of a servo loop is changed from a solid line A1 to a dotted line A2. Consequently, a point of resonance of the drive unit enters in a servo band of the servo loop.

For preventing this entrance, values of the control parameters PID (Proportional, Integral and Differential) are decreased from a solid line B1 down to a dotted line B2 in FIG. 6. That is, the command value is calculated by use of the second low control parameters PID which have been decreased a reference control parameter value by a factor N (N>1). The gain of the control loop is thereby kept as shown by the solid line A1.

(S4) The DSP 10, when the present position is within the amplifier gain change section, indicates an N-fold gain (second high gain) to the driver 12. The gain of the driver 12 thereby is selected a N-fold value. Accordingly, the command value is, after being converted into a control voltage by the DAC 11, converted into the drive current with the N-fold gain (second high gain) in the driver 12. Through this process, the motor is driven. Then, the operation returns to step S1.

(S5) When it is judged instep S2 that the present position is not within the amplifier gain change section, the DSP 10, after calculating a positional error between the command position and the present position, calculates a command value by use of the 1-fold control parameters (first high parameters) PID, and outputs this command value to the DAC11.

(S6) The DSP 10, when the present position is not within the amplifier gain change section, indicates the 1-fold gain (first low gain) to the driver 12. The gain of the driver 12 thereby is selected a 1-fold value. Accordingly, the command value is, after being converted into the control voltage by the DAC 11 converted into the drive current with the 1-fold gain in the driver 12. Through this process, the motor is driven. Then, the operation returns to step S1.

Thus, the DSP 10 judges whether the present position is within the gain change section (which corresponds to areas of both ends of the magnet) or off the gain change section (which corresponds to a central area of the magnet), and determines a gain of the driver 12. It is therefore feasible to increase a current range without changing the quantization error of the command value of the DSP 10.

Further, the control parameters of the servo control are decreased by the factor N within the gain change section, and hence, even when varying the gain, the point of resonance is prevented from entering the servo band without any change in the gain of the servo band.

In addition to the embodiment discussed above, the present invention may embrace modifications which follow.

(1) The STW has been exemplified by way of a positioning device, however, the present invention can be applied to other devices.

(2) The change in the gain has been explained as the 2-stage variation, however, a variation at three or more stages may also be available as the necessity arises.

(3) The gain change amplifier has been exemplified based on the example in FIG. 3, however, other gain change amplifiers may also be used.

(4) The actuator has been explained as what comes under the rotary type, however, the present invention can be applied also to a linear type actuator.

The positioning device has been described so far by way of the embodiment of the present invention but may be modified in many ways within the range of the gist of the present invention, and those modifications are not excluded from the scope of the present invention.

As discussed above, the present invention exhibits the following effects.

(1) The gain of the voltage/current converting amplifier of the positioning control system is made variable and controlled corresponding to the present position, and hence there is no necessity for covering the maximum current range with the command value. Therefore, even when increasing the current range, the proper quantization error is obtained in the entire movable range, thereby enhancing the positioning accuracy.

(2) Further, with the quantization error remaining unchanged, an S/N ratio can be prevented from decreasing.

What is claimed is:

1. A positioning device for positioning a drive unit in a command position, comprising:
    a position detector for detecting a present position of the drive unit;
    a control circuit for generating a digital dive command value corresponding to a positional error between the command position and the present position;
    a D/A converter for converting the digital drive command value into an analog voltage; and
    a driver, having a plurality of gains, for converting the analog voltage into an analog drive current of the drive unit with a selected gain,
    wherein said control circuit selects the gain of said driver in accordance with the present position, and
    wherein said drive unit is constructed of a DC actuator comprising a magnet and a coil and generating a plurality of different torques in a movable range, and
    said control circuit controls the gain of said driver so that a first selected gain at a central area of said movable range of said DC actuator differs from a second selected gain of marginal areas on both sides of the movable range to compensate said torque difference in said movable range.

2. A positioning device according to claim 1, wherein said control circuit selects a first low gain at the central area and selects a second high gain at the marginal area.

3. A positioning device according to claim 1, wherein said control circuit has a plurality of control parameters for calculating the digital drive command value from the positional error, and selects the control parameter corresponding to the selected gain.

4. A positioning device according to claim 3, wherein said control circuit selects a first high control parameter when a first low gain is selected and selects a second low control parameter when a second high gain is selected.

5. A positioning device according to claim 1, wherein said driver includes an input gain setting circuit for setting an input gain of the analog voltage between a plurality of input gains, and an amplifier for converting into an analog current the analog voltage given the input gain from said gain setting unit.

6. A positioning device according to claim 1, wherein said control circuit is constructed of a processor.

7. A positioning device according to claim 1, wherein said drive unit comprises a DC actuator connected to a disk drive comprising a head, an arm, an actuator and a disk, for stepwise-positioning said head on each track of the disk.

8. A positioning device according to claim 7, wherein said DC actuator has an arm engaged to said arm of the disk drive.

9. A positioning method for positioning a drive unit in a command position, comprising:
    a step of detecting a present position of the drive unit constructed of a DC actuator comprising a magnet and a coil and generating a plurality of different torques in a movable range;
    a step of calculating a digital drive command value corresponding to a positional error between the command position and the present position;
    a step of selecting a drive gain in accordance with the present position;
    a step of D/A converting the digital command value into an analog voltage; and
    a step of converting the analog voltage into an analog drive current of the drive unit with said selected drive gain,
    wherein said selecting step comprises a step of selecting the drive gain so that a first selected gain at a central area of said movable range of said DC actuator differs from a second selected gain of marginal areas on both sides of the movable range to compensate said torque difference in said movable range.

10. A positioning method according to claim 9, wherein said selecting step comprises a step of first selecting a first low gain at the central area and a step of second selecting a second high gain at the marginal areas.

11. A positioning method according to claim 9, wherein said calculating step comprises a step of selecting a control parameter between a plurality of control parameters corresponding to said selected drive gain and a step of calculating the digital drive command value from said positional error and said selected control parameter.

12. A positioning method according to claim 11, wherein said selecting step comprises a step of third selecting a first high control parameter when a first low gain is selected and a step of fourth selecting a second low control parameter when a second high gain is selected.

13. A positioning method according to claim 9, wherein said converting step comprises:
    a step of determining an input gain of the analog voltage between a plurality of input gains; and
    a step of converting into said analog drive current said analog voltage given said input gain.

14. A positioning method according to claim 9, further comprising
    a step for driving by said analog drive current the drive unit for stepwise-positioning a head on each track of a disk in a disk drive.

15. A positioning method according to claim 14, wherein said driving step includes a step for driving the drive unit having an arm engaged to an arm of said disk drive.

16. A servo track writer for writing servo information on each track of storage disk in a disk device, comprising:
    a DC actuator comprising a magnet and a coil and generating a plurality of different torques in a movable range;
    an arm engaged with a head support arm of said disk device and driven by said DC actuator;
    a position detector for detecting a present position of the DC actuator;

a control circuit for generating a digital drive command value corresponding to a positional error between a command position and the present position;

a D/A converter for converting the digital drive command value into an analog voltage; and a driver, having a plurality of gains, for converting the analog voltage into an analog drive current of the DC actuator with a selected gain, wherein said control circuit controls the gain of said driver so that a first selected gain at a central area of said movable range of said DC actuator differs from a second selected gain of marginal areas on both sides of the movable range to compensate said torque difference in said movable range.

17. A servo writing method for writing servo information on each track of a storage disk in a disk device, comprising:

a step of issuing a command position for servo writing;

a step of detecting a present position of a DC actuator having an arm engaged with a head support arm in said disk device and generating a plurality of different torques in a movable range;

a step of calculating a digital drive command value corresponding to a positional error between the command position and the present position;

a step of selecting a drive gain in accordance with the present position;

a step of D/A converting the digital command value into an analog voltage; and a step of converting the analog voltage into an analog drive current of the drive unit with said selected drive gain, wherein said selecting step comprises a step of selecting the drive gain so that a first selected gain at a central area of said movable range of said DC actuator differs from a second selected gain of marginal areas on both sides of the movable range to compensate said torque difference in said movable range.

* * * * *

UNITED STATES PATENT AND TRADEMARK OFFICE
CERTIFICATE OF CORRECTION

PATENT NO.     : 6,452,739 B1
DATED          : September 17, 2002
INVENTOR(S)    : Hino et al.

It is certified that error appears in the above-identified patent and that said Letters Patent is hereby corrected as shown below:

<u>Column 7,</u>
Line 26, please delete "dive" and insert -- drive --

Signed and Sealed this

Eighteenth Day of March, 2003

JAMES E. ROGAN
*Director of the United States Patent and Trademark Office*